March 8, 1955        M. MAUL        2,703,617

RECORD CARD REPRODUCING PUNCH

Filed Aug. 5, 1952        6 Sheets-Sheet 1

Inventor:
Michael Maul
BY
ATTY.

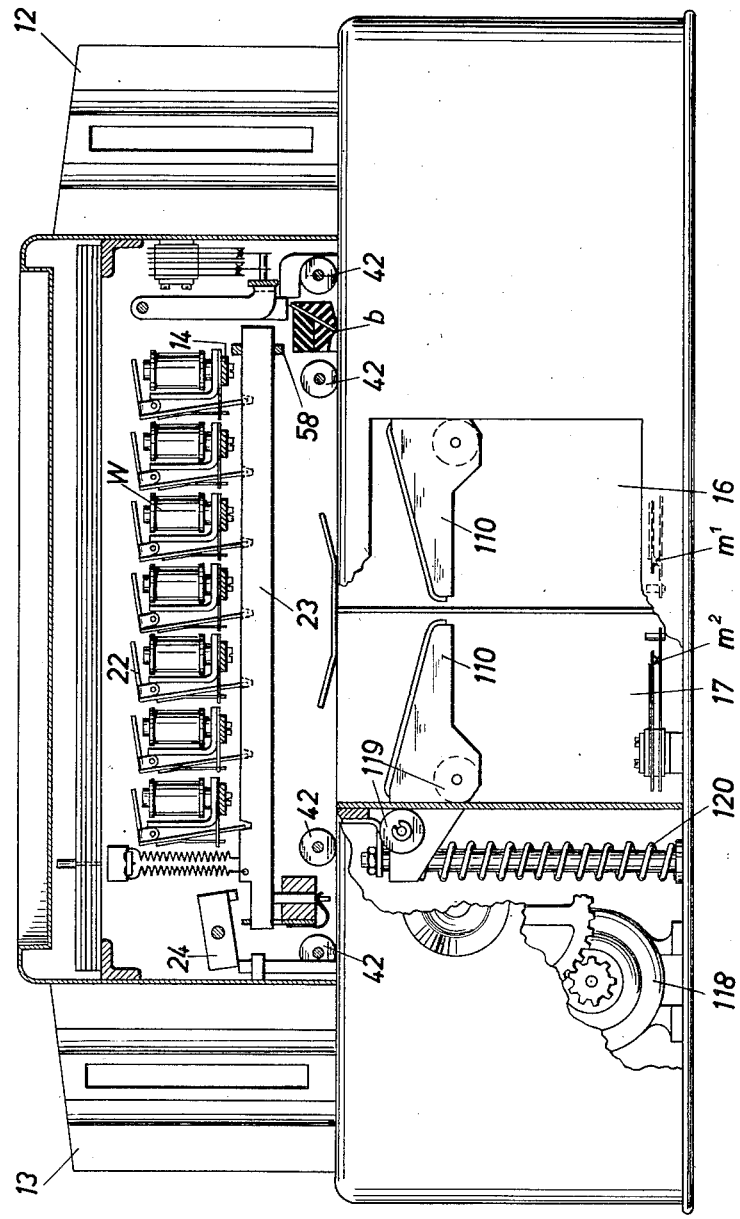

March 8, 1955   M. MAUL   2,703,617
RECORD CARD REPRODUCING PUNCH
Filed Aug. 5, 1952   6 Sheets-Sheet 3

Inventor:
Michael Maul

March 8, 1955     M. MAUL     2,703,617
RECORD CARD REPRODUCING PUNCH

Filed Aug. 5, 1952     6 Sheets-Sheet 4

Inventor:
Michael Maul

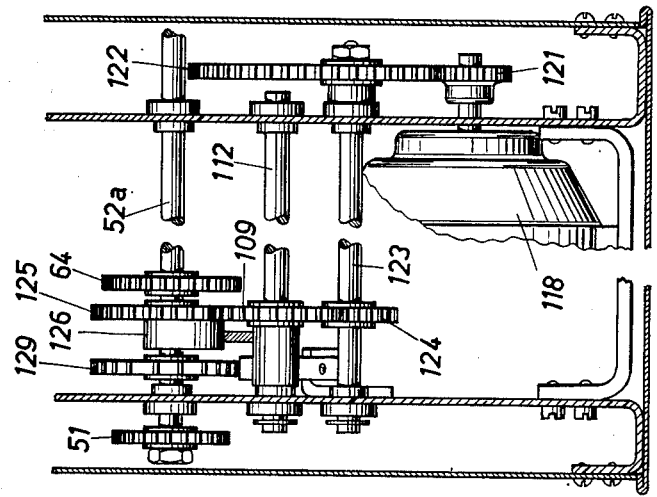
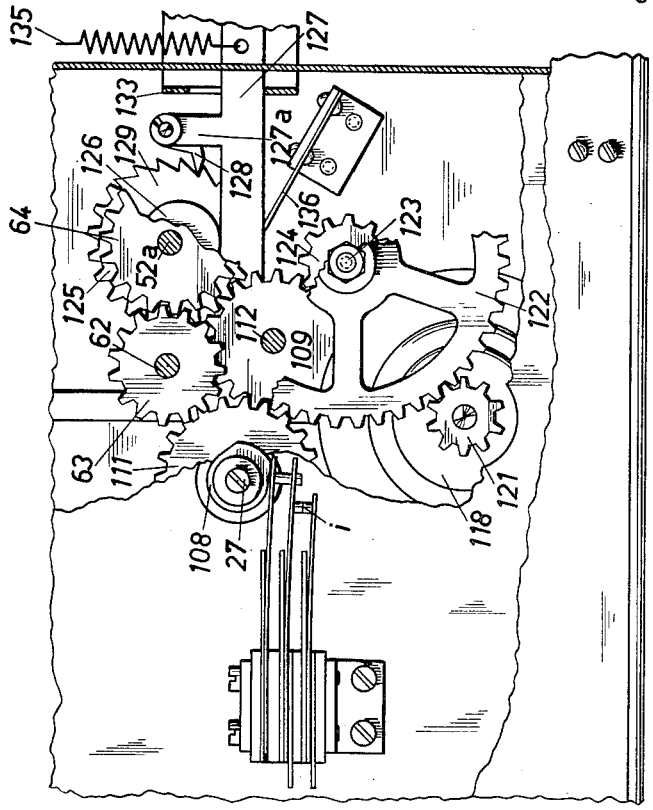

March 8, 1955  M. MAUL  2,703,617
RECORD CARD REPRODUCING PUNCH
Filed Aug. 5, 1952  6 Sheets-Sheet 6

Inventor:
Michael Maul

United States Patent Office 2,703,617
Patented Mar. 8, 1955

2,703,617
RECORD CARD REPRODUCING PUNCH

Michael Maul, Schwabach, near Nurnberg, Germany

Application August 5, 1952, Serial No. 302,751

Claims priority, application Germany August 10, 1951

5 Claims. (Cl. 164—115)

In the art of record card machinery it is customary to transfer in so called automatic reproducing punches perforated data from one stack of cards (pattern cards) to another stack of cards (receiving cards). Since for this transfer frequently only certain columns of the stack of pattern cards must be taken into consideration with respect to the transfer to the receiving cards, for the purpose of the column selection, a column selector device is provided, i. e. a device which permits, for any desired column, the selective elimination of the control of the pattern card analyzing means upon the receiving card punching means. By a "column" is usually understood a line of index positions in which any of a number of character designations may be provided by punching the index positions of the column. The columns usually extend along the shorter axis of the card and accordingly a row of adjacent columns extends along the longer axis of the card.

A particularly efficient type of these machines operates in such way that the columns of the pattern card are simultaneously analyzed by means provided across the feed path of the pattern card and extending over all columns, said analyzing means controlling punching means simultaneously in all columns, the punching means being provided across the feed path of the receiving cards and also extending over all columns. This arrangement does not only permit a high efficiency but it permits also the so called "column interchangeability" which means that the data of the pattern cards can be transferred into different columns of the receiving cards.

Now, the present invention provides a reproducing punch which is particularly designed for the perforation of cards having a plurality of so called "perforation decks" each consisting of a series or row of adjacent columns, each column comprising a plurality of index positions. In the present instance, for all perforation decks a single set of analyzers common to all decks of a pattern card and a single set of punches common to all decks of a receiving card are provided, past which the decks are fed one by one. The set of analyzers extends across the feed path for the pattern cards over all columns of a deck, and in a similar manner the set of punches extends across the feed path for the receiving cards over all columns of a deck. The cards are fed in such way that a deck of the receiving cards is fed past said set of punches while the corresponding deck of the pattern card is fed past said set of analyzers. Though the analyzing means and the punching means are common to all decks, according to the instant invention an individual column selection is obtained for each perforation deck by means of a separate set of column selectors associated with each deck for selectively eliminating the control of said pattern card analyzing means upon said receiving card punching means, in combination with means for automatically rendering operative said various sets of selection means one by one in accordance with the passage of the coordinated decks under the pattern card analyzing means and the punching means respectively.

In this way, in a single card passage reproducing punching is effected in all or in individual perforation decks in accordance with the column selection in the sets of column selectors associated with the decks.

Due to the provision of separate sets of column selectors, the present invention permits also the above mentioned interchangeability for each deck though only a common set of analyzing means and a common set of punching means are provided for all decks.

A solution particularly pleasing in construction will be obtained if the plug connections, permitting the above mentioned interchangeability, as well as the selector magnets with their punch selector bars are arranged between the two card magazines and if the cards are fed from the two magazines in opposite directions relatively to each other below the punching magnets and the analyzing brushes towards the middle of the machine to the card receivers.

A preferred embodiment of the invention is illustrated in the accompanying drawings in which:

Figure 3 shows the machine partially in section and partially in front view.

Figs. 7 and 8 show the drive as viewed from the motor in front and in side view.

Principal operation of the machine

Figure 1:
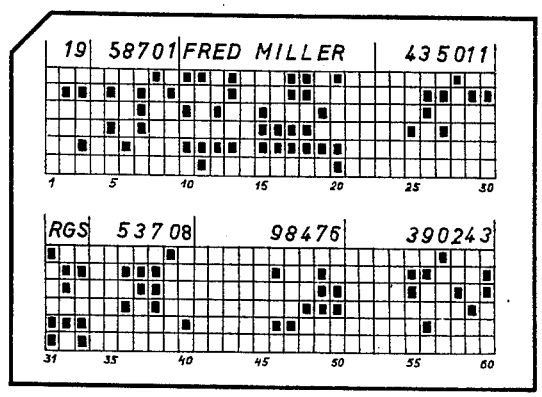
Figure 1 shows a perforated card which has been reproduced in the machine.
Figure 2:
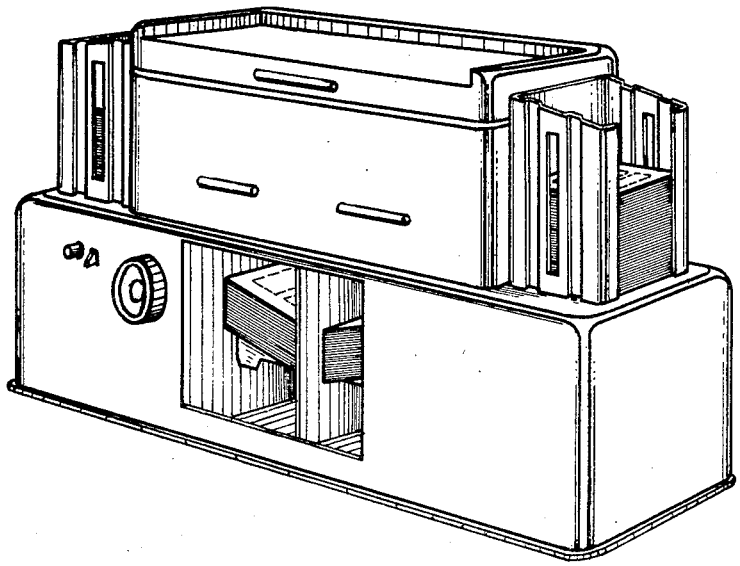
Figure 2 shows a perspective general view of the machine.
Figure 5:
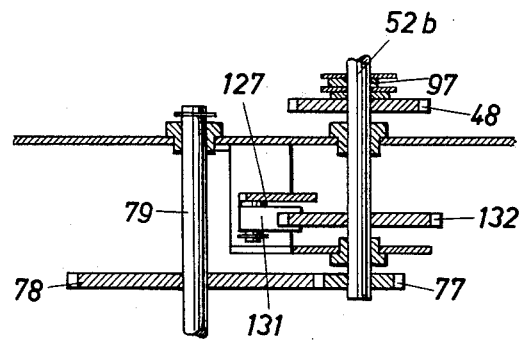
Figure 5 shows a section through the pawl drive for the card feed of Figure 4.

The machine operates with cards one of which is shown for instance in Fig. 1. The card has two decks each comprising 30 columns, each column including 6 hole positions. The perforations in the card are provided in hole combinations. In the further description the pattern card from which the data are analyzed will be designated as card I and the receiving card in which the entries are made will be designated as card II.

The column interchangeability within each deck is obtained by a plug board by which any analyzing brush may be connected to any desired punching magnet. In order to permit column selection in cards having a plurality of decks for each single deck and in order to permit card reproducing in a single card passage, each deck has an individual plug board associated thereto. The analyzing device and the punching mechanism are connected to these plug boards consecutively depending on which deck is just below the same.

The cards I are inserted in the right hand magazine 12 (Fig. 3). The cards II are inserted in the left hand magazine 13. The cards run in opposite directions and are deposited in the receivers 16 and 17.

Figure 4:
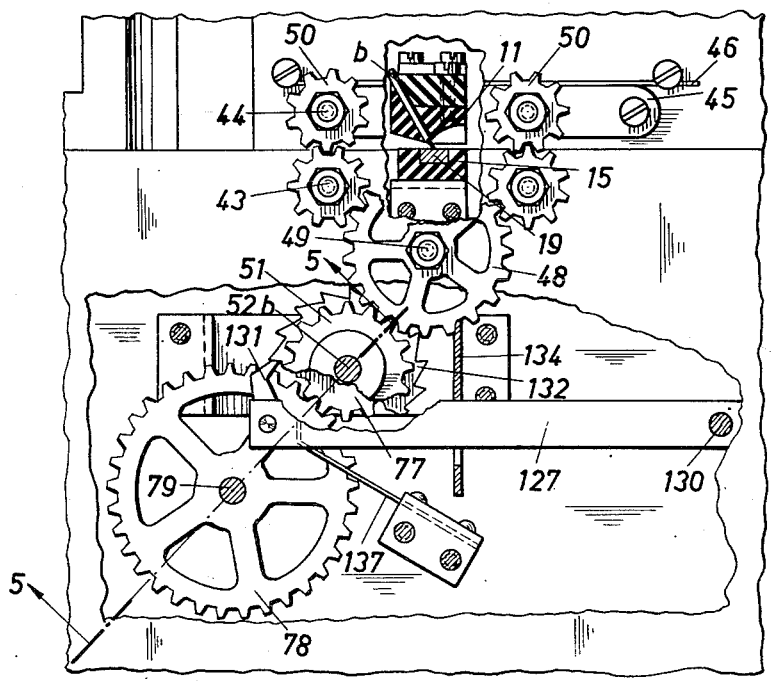
Figure 4 shows the construction of the analyzing brush and of the drive for the card feed thereat.

The card I is moved by card knives between the feed rollers 42 and is fed by the same under the analyzing brushes b. The analysis of all columns of one deck is effected simultaneously while the various hole positions are analyzed and transferred consecutively. The feed of the card is effected step by step. Simultaneously with the card I a card II has been moved under the punching device under which the card is also fed step by step. The perforations which have been analyzed by the brushes b in the card I are transferred to the corresponding punching devices which punch the card II. The brushes b (Figs. 3 and 4) are fastened in the set of brushes 11 which in turn is fastened to the side walls of the machine. Under the brushes there is the contact plate 19 which is inserted in the insulating body 15, also mounted on the side walls of the machine.

Figure 6:
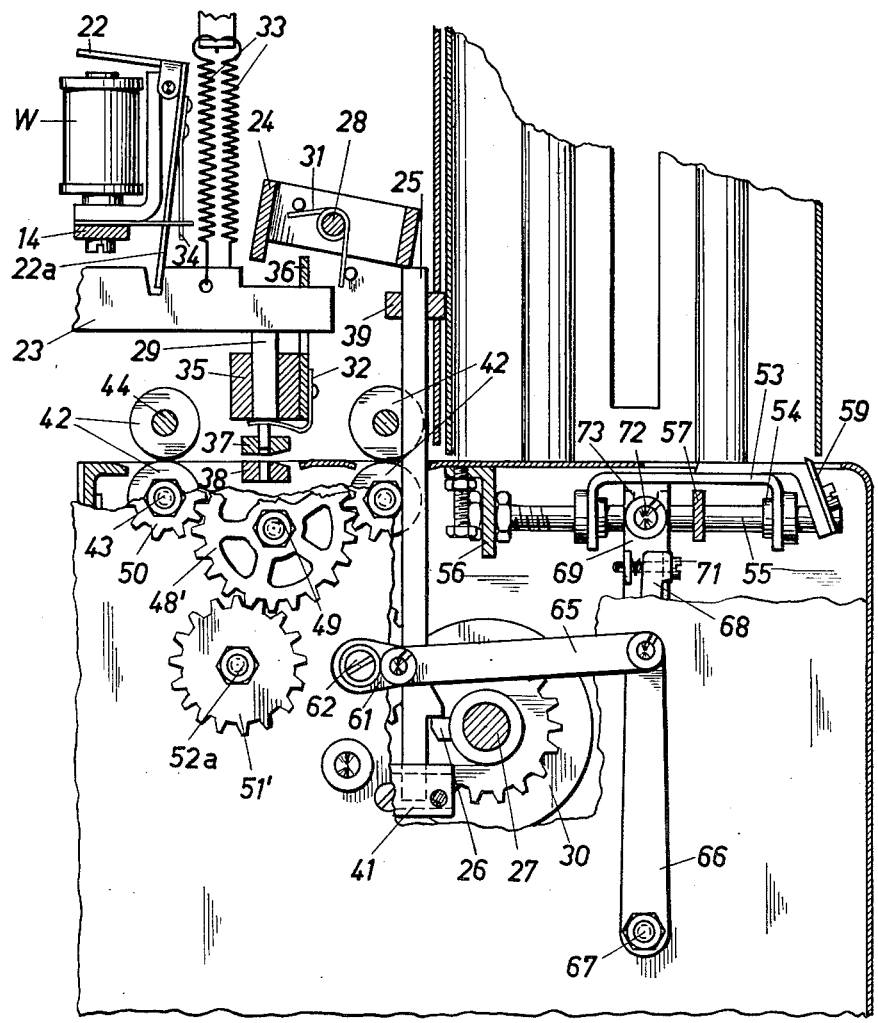
Fig. 6 shows the arrangement of the perforating device and of the card supply means.

The brushes may receive current from the contact plate 19 through the holes of the card I and may conduct this current to the selector magnets W (Fig. 6). Upon energization the latter will attract their armatures 22 moving, by means of their arms 22a, the selector bars 23 to the right (Fig. 6) so that the full depth of the latter will come under the punching yoke 24.

Through the cam 26 on the shaft 27 the punching yoke 24 is rocked through the pusher bar 25 in counter-clockwise direction about its shaft 28 thus pressing the displaced selector bars 23 downward. The latter will engage their punches 29 and will press the same through the card II which moves in synchronism with the card I. The shaft 28 for the punching yoke is mounted on the side walls of the machine. The spring 31 will restore the yoke 24 and the pusher bar 25 to their home position again. The pusher bar is guided at its upper part in the guide 39 and at its lower part in the bracket 41. The guide 41 serves at the same time as a stop for the movement of the pusher bars in a downward direction.

The punches 29 are guided by their shanks in a cross bar 35 which is fastened to the side walls of the machine. The rectangular part of the punch is also separately guided in a cross bar 37 which is fastened to the matrix 38. Between the cross bar 37 and the matrix 38 there is a gap through which the card may be fed. The springs 32 urge the punches 29 to their home position. By springs 33 and through the armature 22, by means of spring 34, the selector bars 23 are restored to their home position. The selector bars are guided in slots of the plate 36 which is fastened to the cross bar and in slots in the plate 58 (Fig. 3). The selector magnets W are screwed to the stirrups 14 which are fastened to the side walls of the machine.

Card feed

The cards I are inserted in the magazine 12 and the cards II in the magazine 13 (Fig. 3) as has already been mentioned. Below the two magazines there are slides 53 (Fig. 6) which may slide to and fro upon the round guides 55. At the one end the guides 55 are screwed to the bracket 56 and are moreover held by the cross bar 57. The slides 53 carry two adjustable knives 59. The movement of the slide is effected by the crank 61 on the shaft 62 which is driven through gears 63 and 64 (Fig. 7) from the locking wheel shafts 52a and 52b respectively rotating once per card cycle. The locking wheel shaft 52a serves for the drive of the card feed for card II and the locking wheel shaft 52b for the drive of the card feed for card I. The ratio of the gears is 1:1. Through link 65 the rocker 66 is connected to the crank 61 (Fig. 6) said rocker being fast upon the shaft 67. Upon this shaft there is also fast the lever 68. The lever 69, however, is loosely rotatable upon the shaft 67. It is connected through set screw 71 to the lever 68 and may be displaced with respect to the latter by means of the screw, thereby permitting an exact adjustment of the card knives. At its upper end the lever 69 is forked and embraces a bolt 72 seated in an arm 73 of the slide 53 and moving the latter during the rocking movement of the lever. The card knives 59 will then move the cards between the rollers 42.

The feed of the card to the analyzing or punching device and finally to the card receivers is effected by the rollers. The shafts 43 of the lower rollers are mounted in the side walls of the machine whereas the shafts for the upper rollers are mounted in the arms 45 (Fig. 4) the latter being urged downward by the springs 46. To the one end of the shafts 43 are fastened gears 50. The gears of the upper rollers are in each instance driven by those of the lower rollers. Moreover, the gears of the lower rollers mesh with idle gears 48 and 48' driven by the gears 51 and 51' on the shafts 52a and 52b respectively.

The drive of the shafts 52a and 52b respectively is effected step by step from the motor 118 (Fig. 3) by means of a step by step shifting mechanism. Through pinion 121 (Figs. 7 and 8) the motor drives the wheel 122 fast upon the shaft 123. On the shaft 123 there is also mounted the pinion 124 which engages the gear 109 of the shaft 112. All the shafts just described are mounted in the side walls of the machine. The gear 109 meshes with the gear 125 which is rigidly connected to the cam 126 and is freely rotatable upon the shaft 52a. The cam 126 actuates a lever 127 having a pawl 128 mounted on its arm 127a. The ratchet wheel 129 and therewith the shaft 52a are driven step by step by the pawl 128.

The drive of the shaft 52b is effected in the same manner through lever 127 rockably mounted about a bolt 130 in the middle portion of the machine and carrying on its other end the pawl 131 (Fig. 4) which engages the ratchet wheel 132. The lever 127 moves in the guides 133 and 134 (Figs. 4 and 7) and is drawn towards the cam 126 by the spring 135. The pawls 128 and 131 are resiliently urged against the ratchet wheels 129 and 132. In order to prevent a backward movement of the ratchet wheels 129 and 132 detent springs 136 and 137 are provided. Accordingly the lever 127 driven by the cam 126 drives at the same time the ratchet wheels 129 and 132 through the pawls 128 and 131.

When the cards have passed through the analyzing and punching device respectively they will drop into the card receivers 16 or 17 in which the card supports 110 (Fig. 3) are provided. The supports are guided by the rollers 119 and are urged upwardly by the springs 120. The springs are so proportioned that they will yield in accordance with the weight of the card. When the card support has reached its lowest position it will open its contact $m^1$ and $m^2$ respectively thereby stopping the machine.

Plug board

As has been mentioned above an arbitrary column interchanging is to be possible within the decks. A further requirement consists in that the switching device necessary therefor should be easily visible and simple in operation and that erroneous switching is to be avoided. This is obtained by the wireless plugging.

Each switching element which is to be connected to another one, such as for instance the brushes with the selector magnets, has a bar associated therewith. The bars are so arranged relatively to each other that they cross the bars of the switching elements to which they are to be electrically connected. Bars crossing each other are arranged in different layers. Wherever there is a crossing there is a hole in the bars. By means of the plugs the connection between the bars may be established by inserting said plugs at the corresponding crossing points.

Figure 11:
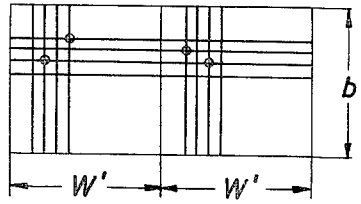
Figs. 11 to 13 show the construction of the plug board.
Figure 12:
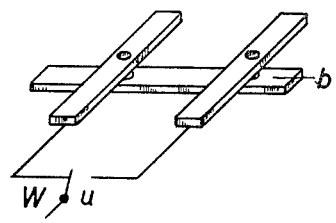
Figure 13:
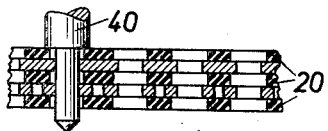

In accordance with the two decks the plug board is divided into two plug fields as is diagrammatically illustrated in Fig. 11. The brushes are connected to the range $b$ and the selector magnets for the punching device to both of the ranges W'. Accordingly from each selector magnet two connections lead to the plug board each one of them leading to one of both the fields W'. If now the respective first decks are under the analyzing and punching devices the selector magnets are connected to the left hand field W'. If the respective second decks are under the analyzing and punching devices the selector magnets are connected to the right hand field. Column selection is therefore effected in the left hand field for the first deck and in the right hand field for the second deck. The arrangement of the bars for one brush and one selector magnet may be seen from Fig. 12. Fig. 13 shows the section through the plug board. The two layers of bars are herein separated from each other by the insulating plates 20. The connection between two bars is effected by the plugs 40.

Contact control

Figure 9:
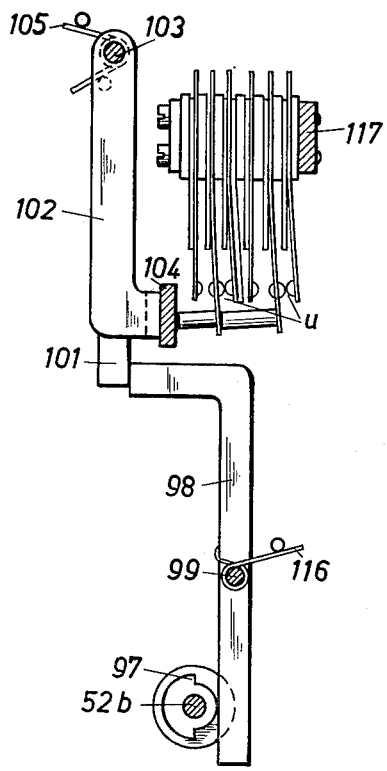
Fig. 9 shows the actuating device for the deck shifting contacts.

As has just been described, on deck change or arrival of the next card the connection of the selector magnets to the bars is shifted. This shifting is effected by means of contacts $u$ arranged between the bars and the selector magnets. Accordingly 30 contacts $u$ must be provided. The 30 contacts $u$ are fastened on the stirrup 117 (Fig. 9) which is screwed to the side walls of the machine. In order to save space always two shifting contacts have been arranged above each other. The contacts are actuated by the yoke 104 carried by the arms 102 on the shaft 103. To the shaft 103 is also fastened the lever 101 which is rocked through lever 98 by cam 97 in counter-clockwise direction. The yoke 104 is held by spring 105 in its home position. The lever 98 is pressed by the spring 116 against the cam 97. The latter is mounted on the shaft 52b which rotates once per card cycle. The dimensions and position of the cam have been so chosen that it will shift the contacts on each deck change or arrival of the next card.

Raising of the brushes from the card while energized must be prevented since otherwise sparking could arise which would lead to a rapid wear or welding of the brushes. In order to avoid this an impulse contact $i$ (Fig. 7) is provided. It is controlled by a cam 108 on the shaft 27 which rotates once per card step. The position and dimensions of the cam 108 have been chosen in such a manner that a current impulse will flow through the brushes as soon as there is a hole position under the same.

Figure 10:
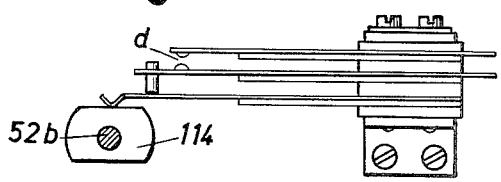
Fig. 10 shows a cam contact for interrupting the current to the brushes during deck change.

Moreover the current can flow to the brushes only if there is a deck under the same. During deck or card change the current circuit to the brushes must be interrupted in order to avoid erroneous perforations. This is obtained by the contact $d$ (Fig. 10). The latter is controlled by the cam disk 114 upon the shaft 52$b$ rotating once per card cycle. As has been mentioned before the shaft 52$b$ serves at the same time for the drive of the feed rollers and the card knives for the card I. The shape of the cam as well as its position have been so determined that the current circuit is interrupted on deck change and on arrival of the next card respectively.

Figure 14:
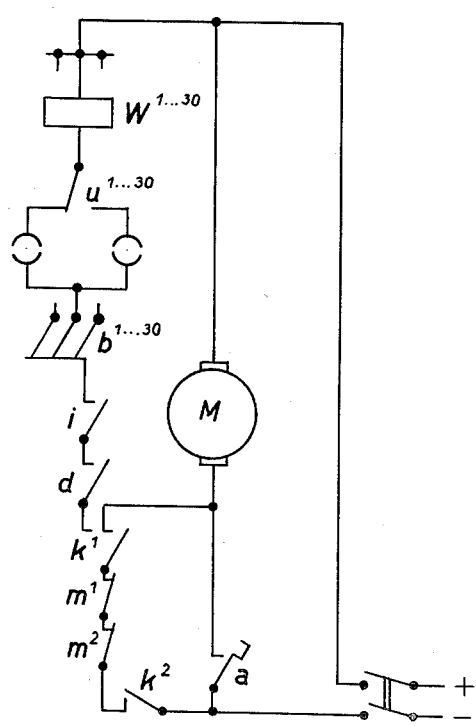
Fig. 14 shows the wiring diagram of the machine.

Circuit diagram (Fig. 14)

In the illustration of the circuit diagram for the card reproducer a simplified method has been chosen, as is generally used in the art of communication. If several identical units are provided, such as clutch magnets and brushes, only one of them is shown in the diagram while the remainder are indicated by the distribution connections only. The number of the units is indicated by the Arabic index number. The magnets are indicated by capitals and the contacts by small letters. Manually actuated contacts are characterized by a key-like hook on the upper end of the movable contact member. The contacts are shown in the positions which they occupy when the machine is at rest.

When the machine is switched on it will not yet start to run. Only when the start key $a$ is depressed will the motor receive current through the said key so that it will begin to run and will feed cards to the analyzing and punching device respectively. If the card I arrives with its upper deck under the set of analyzers it will actuate a card lever of known construction which has been omitted in the drawing for reasons of clarity. The card lever closes its contact $k^1$. At the same time the card II has arrived at the punching device and will actuate there also a card lever which closes the contact $k^2$. Now, current can flow from negative through the contacts $k^2$, $m^2$, $m^1$, $k^1$ to the motor so that the start key $a$ can be released.

When the first hole position is under the analyzing device the two cam contacts $i$ and $d$ are also closed, so that current can flow from negative through the contacts $k^2$, $m^2$, $m^1$, $k^1$, $d$, $i$ through the brushes $b$, the plug board indicated symbolically by a circle in dotted lines, and the contact $u$ through the selector magnets W to positive. The selector magnets W will respond and will adjust the selector bars 23 whereupon perforations will be effected in card II. Shortly before the card is fed to the next hole position the cam contact $i$ opens and interrupts the whole controlling current circuit.

When the next hole position is under the brushes the contact $i$ closes and the current circuit will again be established as has just been described.

When the upper deck of the card I has been analyzed or the card II has been punched the lower deck will pass under the analyzing or marking device. At the same time shifting over of the selector magnets to the right hand plug field is effected by means of contacts $u$.

After analysis of the last row of hole positions the card I as well as the card II will be moved to the card receivers. At the same time the contacts $u$ will be restored to their home position and the operating cycle just described will be repeated for the next card.

If one of the two card receivers is filled with cards either the contact $m^1$ or $m^2$ is opened thereby interrupting the whole current circuit and stopping the machine. The same will occur if no more cards are fed. In this instance one of the two card levers will return to its home position whereby its contact $k^1$ and $k^2$ respectively will open, thereby also interrupting the current circuit.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

I claim:

1. In an automatic multiple-deck card reproducing machine for punching receiving cards under the control of pattern cards, each kind of said cards having a plurality of adjacent record columns in each deck and each column having a plurality of index positions, in combination, analyzing means for said pattern cards consisting of a row of adjacent analyzers and having one analyzer for each record column, said analyzer being common to alined record columns in the various decks, means for feeding said pattern cards past said row of analyzers to effect analysis of the index positions of each column one by one and the various decks one by one by said row of analyzers, punching means for said receiving cards consisting of a row of adjacent punches and having one punch for each record column which is also common to alined record columns in the various decks, means for feeding said receiving cards past said row of punches adapted to punch the index positions of each column one by one and the decks one by one by said row of punches, the feeding means for both kinds of cards operating synchronously so as to analyze an index position in a column of a deck of the pattern card while the correponding index position in the corresponding column of the corresponding deck of the receiving card is under the punches, means for controlling said punches by said analyzing means, an individual set of pre-settable selection means for each deck for rendering the control of said analyzers operative or inoperative upon said punches, and means for automatically rendering said various sets of selection means operative one by one in accordance with the consecutive passage of the co-ordinated decks under the analyzing means and the punching means, respectively.

2. A machine as specified in claim 1 wherein said row of analyzers consists of a row of analyzing brushes and wherein each punch of said row of punches is under the control of an electro-magnet which, in turn, is under the control of an analyzing brush, and wherein each of said individual sets of pre-settable selection means for each deck includes a multiple plug comprising two layers of plug bars arranged at right angles to each other in the two layers, the bars of the one layer being connected to the analyzing brushes and the bars of the other layer being connected to controlling magnets for the punches, plug pins for connecting the bars of superpositioned layers at the crossing points of the bars, and means for including said multiple plugs for the various decks one by one in the controlling circuits between said brushes and said electromagnets in accordance with the consecutive passage of the co-ordinated decks under the analyzing means and the punching means, respectively.

3. In a machine as specified in claim 1, a supply magazine for the pattern cards, a supply magazine for the receiving cards, feeding paths for the two kinds of cards arranged in a straight line opposite each other, card receiving pockets at the end of each feeding path below the same in the middle portion of the machine, and selector bars for said punches, said selector bars being under the control of controlling magnets energised under the control of said analyzing brushes, the selector bars and the controlling magnets being arranged above the feeding paths between said two card supply magazines.

4. In an automatic multiple-deck card reproducing machine for punching receiving cards under the control of pattern cards, each kind of said cards having a plurality of adjacent record columns in each deck and each column having a plurality of index positions, feeding means along a feeding path for said pattern cards, a single set of analyzing means across said pattern card feeding path extending over all columns of a deck but common to all decks, said pattern card feeding means feeding the said pattern cards one by one and each card deck-by-deck past said set of analyzing means, feeding means along a feeding path for the receiving cards, a single set of punching means across said receiving card feeding path extending over all columns of a deck but common to all decks, said receiving card feeding means feeding said receiving cards one by one and each card deck-by-deck past said punching means, a deck of the receiving card being fed past said set of punching means while the corresponding deck of the pattern card is fed past said set of analyzing means, means for controlling said punching means by said analyzing means, a separate set of selection means for the columns of each deck for selectively eliminating the control of said analyzing means upon said punching means, and means for automatically rendering operative said various sets of selection means one by one in accordance with the passage of the co-ordinated decks under the pattern card analyzing means and the receiving card punching means respectively.

5. In an automatic multiple-deck card reproducing machine for punching receiving cards under the control of pattern cards, each kind of said cards having a plurality of adjacent record columns in each deck and each column having a plurality of index positions, in combination, analyzing means for said pattern cards consisting of a row of adjacent analyzers and having one analyzer for each record column, said analyzer being common to alined record columns in the various decks, means for feeding said pattern cards past said row of analyzers to effect analysis of the index positions of each column one by one and the various decks one by one by said row of analyzers, punching means for said receiving cards consisting of a row of adjacent punches and having one punch for each record column which is also common to alined record columns in the various decks, means for feeding said receiving cards past said row of punches adapted to punch the index positions of each column one by one and the decks one by one by said row of punches, the feeding means for both kinds of cards operating synchronously so as to analyze an index position in a column of a deck of the pattern card while the corresponding index position in a column of the corresponding deck of the receiving card is under the punches, means for controlling said punches by said analyzing means, a separate set of selection means for the columns of each deck for selectively eliminating the control of said analyzing means upon said punching means, said selection means of each set including means for eliminating at will any one of said punches from the control of any one of said analyzers, and means for automatically rendering said various sets of selection means operative one by one in accordance with the consecutive passage of the coordinated decks under the analyzing means and the punching means, respectively.

References Cited in the file of this patent

UNITED STATES PATENTS

| | | |
|---|---|---|
| Re. 21,133 | Lake | June 27, 1939 |
| 1,691,917 | Braitmayer | Nov. 20, 1928 |
| 1,791,950 | Bryce | Feb. 10, 1931 |
| 2,045,977 | Bryce | June 30, 1936 |
| 2,240,667 | Paris | May 6, 1941 |
| 2,566,931 | Cunningham | Sept. 4, 1951 |